United States Patent [19]
May

[11] 4,406,995
[45] Sep. 27, 1983

[54] BASE STATION FOR MONITORING CALL BOXES

[75] Inventor: William L. May, Austin, Tex.

[73] Assignee: Gulf & Western Manufacturing Company, Southfield, Mich.

[21] Appl. No.: 262,896

[22] Filed: May 12, 1981

[51] Int. Cl.³ .......................... G08B 1/08; G05B 23/02

[52] U.S. Cl. .................................... 340/539; 340/525; 340/534; 340/825.06; 340/825.55; 340/825.79

[58] Field of Search .................. 340/539, 525, 286 M, 340/734, 524, 501, 506, 514, 515, 534, 789, 798, 790, 799, 800, 801, 825.27, 825.3, 825.55, 825.79, 825.83, 825.06; 364/550, 580; 179/15 R, 15 P

[56] References Cited

U.S. PATENT DOCUMENTS 3,387,268 6/1968 Epstein .......................... 340/825.27
3,764,984 10/1973 McCartney ......................... 340/539

*Primary Examiner*—Donnie L. Crosland

*Attorney, Agent, or Firm*—Body, Vickers & Daniels

[57] ABSTRACT

In a base station for monitoring the status of several function conditions at remote call boxes, each box of which is assigned a distinctive identification code and is capable of selecting and transmitting a message in the form of a plurality of successive signals upon a change in a function condition, which station includes a message decoder, wherein, upon decoding a given box identification code in a message being processed by the base station, a particular one of a plurality of output selector signals is generated. In response to the coded message being processed, a particular output function corresponding to the call box status is generated. A data transfer device directs the output function signal in parallel to a plurality of output matrices, while a selector/decoder device energizes a selected one of the matrixes in response to the output selector signal, thereby displaying the message processed by the base station at the selected matrix.

20 Claims, 7 Drawing Figures

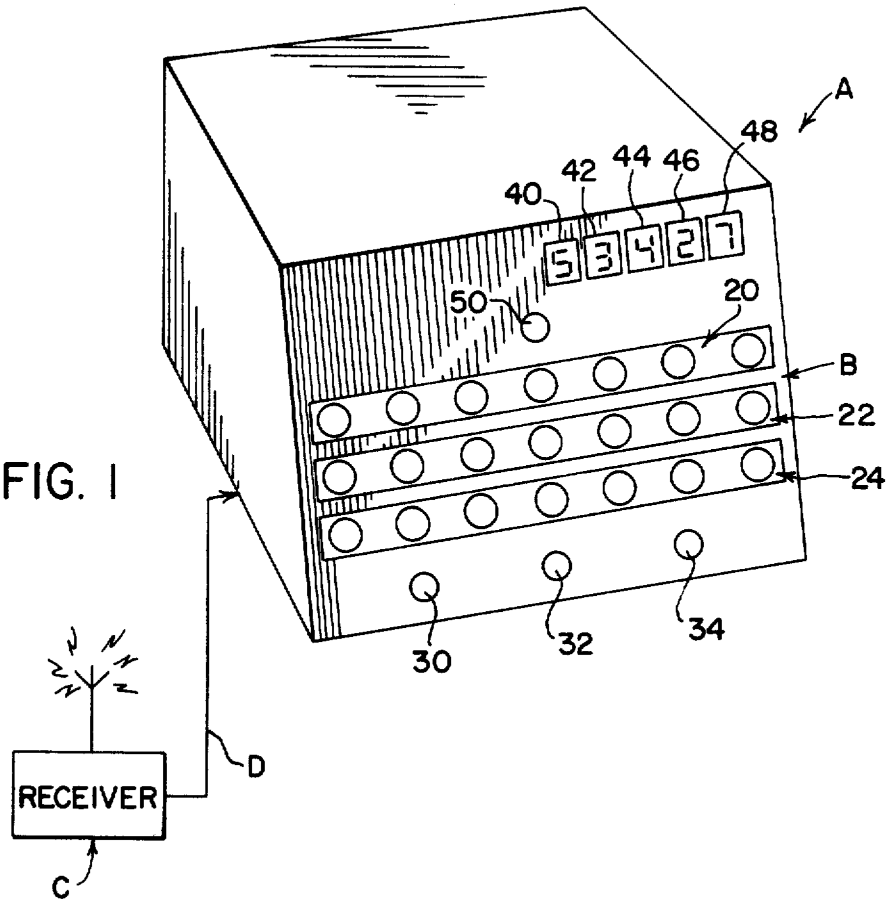
FIG. 1
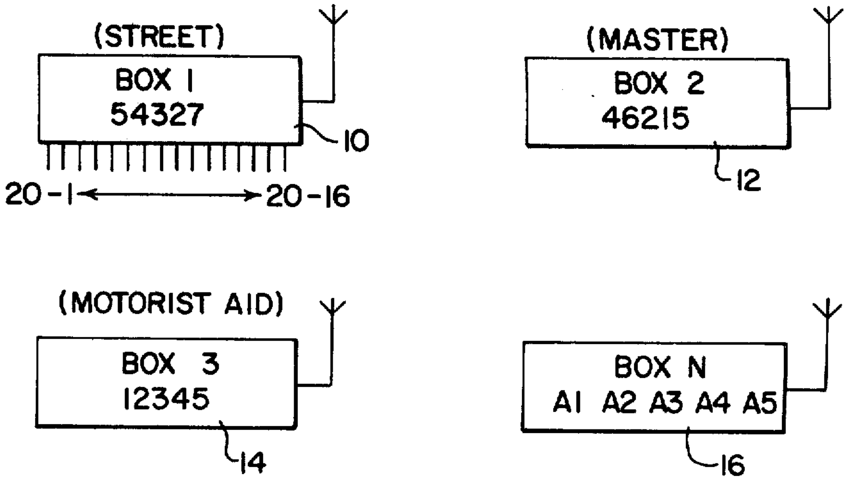

FIG. 2

MESSAGE

| T7 | T6 | T5 | T4 | T3 | T2 | T1 |
|---|---|---|---|---|---|---|
| 8 | 0 | 7 | 2 | 4 | 3 | 5 |
| 8 | 1 | A5 | A4 | A3 | A2 | A1 |
| 8 | 2 | A5 | A4 | A3 | A2 | A1 |
| 8 | 3 | A5 | A4 | A3 | A2 | A1 |
| 8 | 4 | A5 | A4 | A3 | | |
| 8 | 5 | A5 | A4 | | | |
| 8 | 6 | A5 | A4 | | | |
| 8 | 7 | A5 | A4 | | | |
| 9 | 0 | A5 | A4 | | | |
| 9 | 1 | A5 | | | | |
| 9 | 2 | A5 | | | | |
| 9 | 3 | A5 | | | | |
| 9 | 4 | A5 | | | | |
| 9 | 5 | A5 | | | | |
| 9 | 6 | A5 | | | | |
| 9 | 7 | A5 | | | | |

MESSAGE
D
TONE PROCESSOR
60
A
62
48
46
44
42
40
7 2 4 3 5

L L L L L
COMPARE (140)
SHIFT REGISTER (BCD)
R
70
72
324
320
322
300
310
DATA TRANSFER
OUTPUT MATRIX (STREET)
20
E
102
326
312
30
COMPARE
104
80
302
OUTPUT MATRIX (MASTER)
22
90
COMPARE
82
COUNTER
C
R
100
32
92
304
COMPARE
106
RESET
OUTPUT MATRIX (MOTORIST AID)
24
ED
120
122
222
34
208
200
206
202
220
I
R
INDEXABLE MEMORY
T
DATA TRANSFER
204
224
236
SELECTOR (DECODER)
226
230
234
232

BCD SHIFT REGISTER (70)
FROM FIG. 4A
(DATA LATCH)
O/S 14538
STOP-VALID
RESET
DATA LATCH
TO FIG. 5
LATCH
VALID
TO FIG. 5 FUNCTION
TONE DECODER RECEIVER
FROM BOXES
T7 T5 T3 T1
T6 T4 T2
(MESSAGE)
O/S 150 MS
FULL REG. W/O PULSE FOR 150MS
RF

BASE STATION FOR MONITORING CALL BOXES

This invention relates to the art of monitoring remote call boxes and more particularly to an improved base station for monitoring remote call boxes, such as street, master or motorist aid boxes.

BACKGROUND OF THE INVENTION

It has become common practice to provide remote message or call boxes which are connected by radio transmitters with a central receiver that directs incoming messages from the various boxes to a base station. The receiver may be adjacent the base station or spaced therefrom in accordance with standard design considerations. Also, the call boxes or message boxes could be coupled with the receiver by telephone wires or microwave transmission channels in accordance with well known practices. Irrespective of the system structure, the various remote call boxes or message boxes transmit messages to the base station in accordance with conditions at the various call boxes. These call boxes can be street boxes of the type used in fire alarm systems or master boxes of the type used in monitoring certain specific areas of an industrial facility. One of the most widely observed examples of a call box is the motorist air call box located along highways. These boxes can be actuated to indicate a need for police, ambulance, a tow truck or other motorist assistance items. In all instances, the remote call boxes create a message which is indicative of a condition or a change in condition at the call box. For instance, if a fire alarm is manually or automatically activated, a street box will create a message that is transmitted to a base station to identify the box and the type of signal or change of condition being reported. In many systems, the base station monitors street boxes, master control boxes and motorist aid boxes all from a single console. The messages are contained on a series of AM tones which are transmitted in serial fashion to the base station from the remote call boxes. In the past, three to five tones have been employed to provide the address of the particular call box. One or two tones in the message being transmitted are used to indicate the particular function which is being reported by the transmitted message. Consequently, the tone coded message transmitted by the activated call box included tone signals indicative of the box number together with tones indicative of the type of function being reported. Sine there are certain standard functions which are incorporated in all call boxes, such as fire, test and tamper, and some functions normally committed, such as police and ambulance, there was heretofore very little available space on the message to report other functions. Thus, the intelligence transmitted from the call box was somewhat limited. The messages of the prior systems employed digits to identify and locate the box and digits for functions.

The Invention

In accordance with the present invention, there is provided an improvement in the base station of a system of the type wherein the base station monitors remote call boxes of various types. In accordance with this improvement, there is provided a PROM memory device which is indexed after receipt of a message by the base station. During this indexing, the position of the memory is compared with the identification number received by the base station on the tone message from the remote call box. When the memory index location corresponds with the number received in the tone message from the call box, the read only memory is stopped. The indexed position when the memory is stopped is the position or location corresponding to the number of the call box as transmitted by the tone coded message. The indexed memory location at which the read only memory has been stopped includes other binary information. In accordance with an aspect of the invention, the additional binary data or information is used to indicate the type of box which is sending the message. The indexed location of the read only memory has this information. The data indicating the type of box is decoded to energize only one of a plurality of output matrixes which correspond, in the preferred embodiment, to a street box, a master control box, or a motorist aid box. Thus, by reading the binary data information at the indexed location of the read only memory, one of the several output matrixes is energized. At the same time, the tone or tones which indicate the type of function actuated at the remote call box are directed to all output matrixes in a decoded fashion. Only the energized matrix will output information corresponding to the function transmitted to the base station from the remote call box. In other words, if a particular tone or combination of tones is received in the function portion of the transmitted message, this tone is decoded and energizes a particular function light or element according to the type of output matrix selected by the additional data from the indexed position of the read only memory. By using the invention, the function portion of the transmitted signal energizes a different type of function light or element according to the matrix selected by the information or data at the indexed location of the read only memory. Consequently, if sixteen functions can be transmitted by two tones in the message received by the base station, it is possible to create sixteen different output functions for each of the various output matrixes. The matrix select signal from the read only memory energizes a particular matrix. This results in a substantial number of separate and distinct functions indicative of several types of call boxes by using a limited number of function tones.

In accordance with another aspect of the invention, there is provided an internal system testing arrangement for the base station of the type described above. In this system, a fictitious call box at the base station is energized if no message has been received by the base station for a preselected time. This time, in practice, is approximately one hour. To accomplish this function, a resettable timer can be employed which times out at the preselected time and then energizes the internal call box. If a message is received by the base station before the timer times out, the timer is reset and no fictitious box is energized. In this manner, expiration of a long period of time without a message reception energizes the internal call box to transmit tones to the input side of the base station. When this is done, appropriate sound and light alarms actuate so that an operator can determine whether or not the base station recognizes the internal call box. If so, the system is considered to be operational and tested.

In accordance with another aspect of the invention the address or identification of the call box transmitting a signal being processed by the base station is stored as data in a temporary register and a counter counts until there is a comparison between the stored data and the number of counts by the counter. At the same time, the counting pulses of the counter are indexing an indexable memory device from location to location. When the counter is stopped by a comparison with the address of the call box sending the incoming message, the memory device has been indexed to an internal location corresponding to the number of counts. At this indexed location, additional binary data is stored. This data is used to assist in the processing of the incoming message. In the preferred embodiment, this processing assistance by stored data involves the provision of a plurality of output matrixes and an energizing signal for selecting one of the matrix. Consequently, a preselected type of box can be identified and its functions can be displayed or printed because of the additional binary data at the indexed memory location. This increases the function identification capacity of the base station.

By using the present invention, an indexable memory device having additional programmed data at indexed locations can be used to expand the message processing capacity of a base station without going to a programmable controller, mini-computer or other expensive components.

The primary object of the present invention is the provision of a base station for monitoring coded messages from remote call boxes, which base station has means for increasing its function indicating capacity without using computers or programmable controllers.

Yet another object of the present invention is the provision of a base station, as defined above, which base station includes a plurality of output matrixes and means for selecting one of the matrixes when a message from a particular box is being processed by the circuitry of the base station.

Yet another object of the present invention is the provision of a base station, as defined above, which base station includes an internal system testing feature using a fictitious call box at the base station which is energized if there is no incoming message over a preselected period of time.

Yet another object of the present invention is the provision of a base station as defined above, which station includes an indexable memory device that is indexed to a location corresponding to the address or identification of the box transmitting the message being processed. This indexable memory device stores additional information or data to be used in processing the incoming message. In this manner, a number of output matrixes corresponding to the various types of call boxes can be multiplexed to exhibit several output functions without increasing the number of incoming tones necessary to indicate the functions being reported by the message.

These and other objects and advantages will become apparent from the following description taken together with the accompanying drawings described below.

BRIEF DESCRIPTION OF DRAWINGS

FIG. 1 is a pictorial view and partial block diagram illustrating the preferred embodiment of the present invention;

FIG. 2 is a tone chart showing characteristics of the tone message employed in the preferred embodiment of the present invention;

PREFFERED EMBODIMENT OF THE INVENTION

Figure 3:
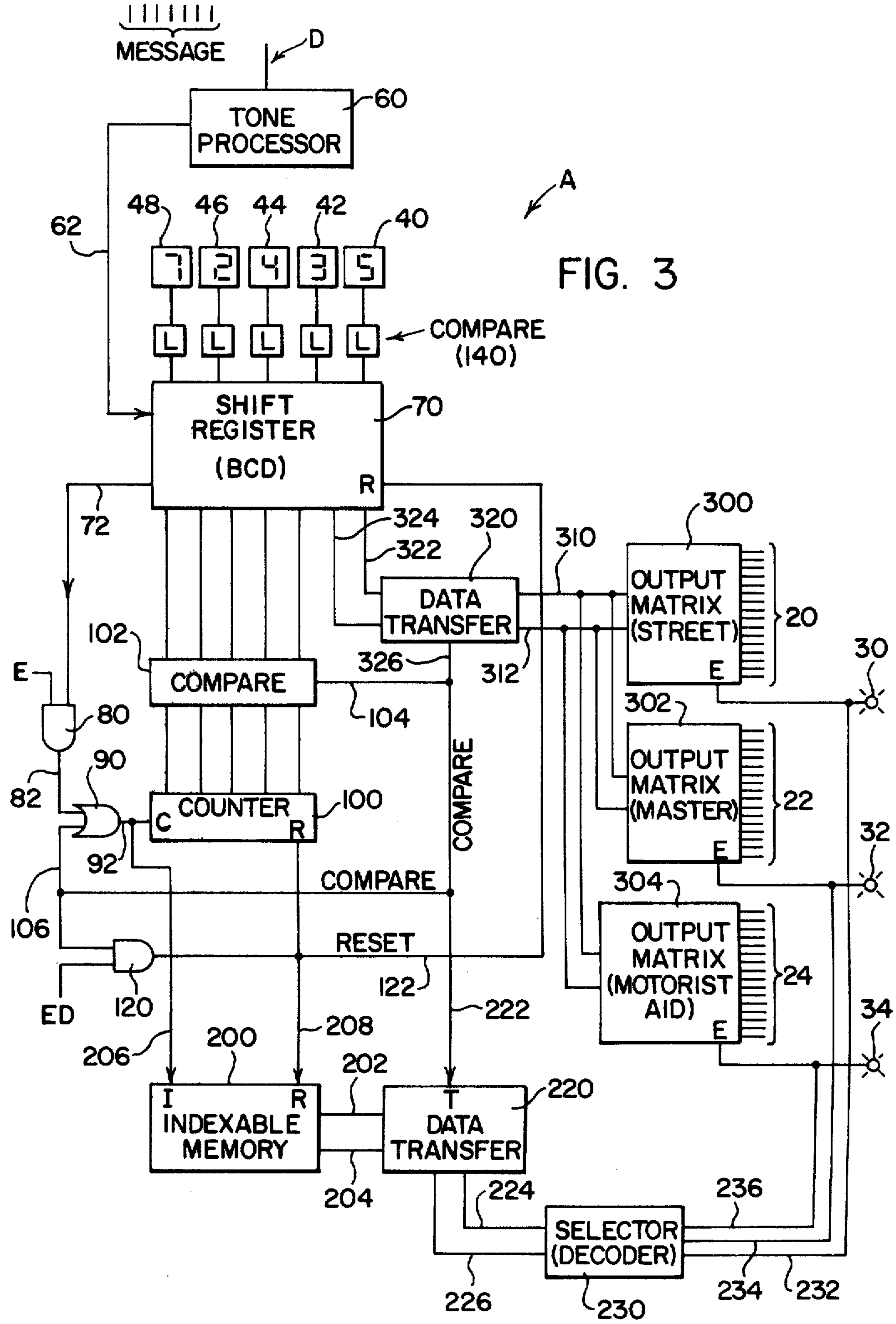
FIG. 3 is a schematic block and wiring diagram showing certain features employed in the preferred embodiment of the present invention and some modifications thereof.

Referring now to the drawings wherein the showings are for the purpose of illustrating the preferred embodiment of the invention, and not for the purpose of limiting the same, FIG. 1 shows a base station A including a console face B which displays various information indicative of a tone message received by a receiver C connected to the base station by an appropriate communication channel, schematically illustrated as telephone lines D. In the illustrated embodiment, receiver C is spaced from base station A; however, it could be adjacent the base station. When spaced from the base station, communication channel D can take a variety of forms, such as a microwave channel or standard telephone lines. Whether or not the receiver C is adjacent to base station A is not important to the invention as long as the transmitted message is communicated to the base station.

A plurality of remote call boxes 10–16, which may be either street boxes, master area monitoring boxes or motorist aid boxes, are provided with internal transmitters to transmit messages in the form of tones. These messages include an identification code or address for the box, together with a particular function that is to be received and identified by base station A. Box 10 is a street box and box 12 is a master control box. Box 14 can be a motorist aid box. In the illustrated example, box 16 may be any of the three types employed in boxes 10, 12 and 14. Of course, various other types of call boxes could be envisioned for use in the present invention; however, generally street, master control and motorist aid boxes are the types to be employed in a system base station A.

It is standard practice to transmit tone messages from remote call boxes and the receiving and decoding of these messages is universally done at base stations. The present invention relates to specific concepts for using the message after it has been accepted by station A. Before explaining these concepts certain aspects of the message transmitted from the boxes should be reviewed. The address for street box 10 is (53427). This address is allocated to the particular box 10 which is known to be a street box. In the past, the tone included box identification data beyond an address. Box 12 has an address of (46215). This address is known to be a master control box, such as used to monitor specific areas within an office or industrial complex. Motor aid box 14 an address of (12345). Each of these box addresses are digits that form part of the total message transmitted from one of the individual boxes 10–16 to a common receiver C connected to the base station A. As a more general definition of the box identification scheme, digits A1, A2, A3, A4 and A5 represent address digits each of which is a particular number (0–9). These digits or number can be coded into the tone message, in accordance with standard practice, and then transmitted across air waves to receiver C. Each of the remote call boxes includes a plurality of inputs presented schematically as inputs 20-1 through 20-16 on box 10. By activating one of these inputs, the box is activated and a message is transmitted to receiver C. This message provides several digits representative of the identification or address of the box and one or two digits which represent the particular input 20-1 through 20-16 which has been energized. Although three tone digits could be used to identify one of several different boxes, in the preferred embodiment of the invention, five separate tone digits are employed. These are represented by A1–A5 at general box 16. Two tone digits are employed for indicating the type of function being transmitted by a message. Of course, a single digit could be used to indicate ten functions. By using two tones, at least the sixteen inputs of 20-1 to 20-16 can be transmitted. In the preferred embodiment, a fire signal, which is employed by all types of remote call boxes uses a code of tone digits (08). Thus, if a fire signal is to be transmitted from street box 10, the tones would be serially transmitted as the number (5342708). This message is illustrated at the top of FIG. 2. This is a series of successive tones with digits (5342708), which tones are transmitted from box 10 to receiver C for processing by base station A. Tones T1–T5, in the illustrated embodiment, are employed for the address of the box (A1–A5). Tones T6 and T7 are employed to provide the transmitted function of that particular box. As can be seen, tone T7 is either a digit 8 or a digit 9. Tone T6 is a digit 0 through 7. Thus, sixteen separate tone combinations can be transmitted to indicate the function of the transmitted message. As an example, function code (08) is assigned to fire for any type of box. The other function tone combinations relate to different functions according to the type of box. For instance a message with function code T6, T7 of (18) may indicate one function in a street box and another function in a master control box. Tone combination T6, T6 of (18) may represent still a further function in a motorist aid box. Consequently, message T1–T7, as shown in FIG. 2, would not identify the type of box sending the message. The type of box is not included in the tones being transmitted. Consequently, a base station, without the present invention and using the seven tone of FIG. 2 would not recognize the function being transmitted. To increase the output capabilities of base station A and to identify the function being transmitted base station A is constructed in accordance with the present invention. As will be discussed later, the lights or indicia in groups 20, 22 and 24 are each assigned to a particular type of box. To this end, group 20 is active when a street box message is transmitted. Indicia in group 22 are active when a master control box message is received. Finally, the indicia in group 24 are actuated by a motorist aid box. By employing the present invention, one of these three groups is activated according to the type of box transmitting a message to receiver C. As an adjunct, console face B can use lights 30, 32, 34 to indicate the particular type of call box transmitting a message. Also, the address display units, or 7-Bar display units 40–48, are used to display the address or box number for the particular box transmitting a signal being processed by base station A. An alarm light 50 indicates that messages are not being received at the base station. For the purposes of recording the various messages, the information from the display units 40–48, the information from indicator lights 30–34 and the particular item lighted in one of the groups 20, 22 or 24 can be printed on an adjacent printer which is activated in parallel with base station A.

Referring now to FIG. 3, a simplified schematic view of the present invention is illustrated wherein base station A includes a tone processor 60 of standard design for receiving the tone coded message by way of communication channel D. Individual tone digits, in BCD format, are serially directed to a shift register 70 through an appropriate communication line, illustrated as line 62. Shift register 70 has seven stages for storing and shifting BCD representations of the various tones of the message received by processor 60. Display units 40-48 are driven by the information in the first five stages of shift register 70 through appropriate 7-Bar decoders controlled by latches L. The first five stages are used for the address digits. After the shift register has received the seven tones, T1–T7, in BCD format, the last stage is filled by BCD data and an output signal is created in output line 72. When this line shifts logic, a message received condition exists in base station A. The signal in line 72 enables clocking AND gate 80 so that internal clock E is directed by output 82 to the input of a clock inhibiting OR gate 90. The clock pulses in line 92 increment binary counter 100 which has five binary coded stages. These counter stages correspond to the five address stages A1–A5 of the message received by base station A. Comparator circuit 102 logically compares the output of the stages of binary counter 100 with the current loaded BCD conditions of the stages in shift register 70. When there is a digit-to-digit comparison a COMPARE signal is created by circuit 102 in output line 104. This COMPARE signal shifts line 106 to inhibit OR gate 90. The clocking pulses no longer appear in line 92. This stops counter 100. Thus, when comparator 102 signals a comparison between the count in counter 100 and the address in shift register 70, counter 100 stops. When line 106 shifts to a logic 1 AND gate 120 is unlatched. A delayed clock ED (which is offset slightly on a time basis from main clock E) is gated through gate 120 to create reset pulses in line 122. The first of these pulses is the reset pulse and it resets shift register 70 to accept a new message and resets counter 100 to process the new message. By providing a delayed clock ED, data from register 70 and other binary data is transferred and latched before the components are reset.

As so far described, counter 100 counts to the address of the box transmitting the message being processed. At that time, a COMPARE signal stops the counter. After a slight time delay a reset pulse in line 122 resets the shift register 70 and counter 100. Following the COMPARE signal, and before the reset signal, certain data is locked into gates by the circuit illustrated in FIG. 3. This data controls the base station to display proper conditions. Also, a standard printer can be used to produce a hard copy of the messages processed at station A.

An indexable memory device 200, having a plurality of locations corresponding with the number of counts of counter 100, is provided. Device 200 is indexed with counter 100. In practice, an EPROM memory (2758 INTEL) is programmed at the factory to produce binary logic on output lines 202, 204 in accordance with the indexed position of the EPROM. Thus, the location to which the read only memory (EPROM) has been indexed corresponds to the box address latched into shift register 70. Various systems could be used to index memory 200 in unison with counter 100. In the illustrated embodiment, line 206 is connected to counting line 92 of gate 90. Each increment of counter 100 indexes memory device 200 into the next adjacent data storage location. When there is a COMPARE signal, pulses in line 206 are stopped. This stops memory device 200 at a specific location corresponding to a given box address. This indexed data location includes at least two bits of binary information or data. This data appears at output lines 202, 204. The logic on these lines changes from indexed location to indexed location during indexing of memory device 200. Although the memory data could designate various information, in practice, the logic on lines 202, 204 is indicative of the type of box sending the message to station A. This data is programmed into the successive locations within memory 200 which will be reached when the box address is reached by counter 100. Thus, upon each indexing of the memory, the logic in lines 202, 204 is indicative of the type of box addressed and stored into particular memory locations. When there is a comparison to stop counter 100, a pulse in line 222 transfers data from lines 202, 204 to output lines 224, 226, respectively. The logic on these lines is decoded by decoder 230 to energize one of three selector lines 232, 234 or 236 in accordance with the binary logic on lines 202, 204. The logic on lines 232, 234, 236 controls the condition of indicator lights 30, 32, 34, respectively. Thus, according to the particular output signal receiving a high signal or logic 1, one of the lights 30–34 is lighted. This indicates whether or not the address of the box sending the message is a street box, a master control box or a motorist aid box. The signals in lines 232–236 are output matrixes selecting signals used to select the output matrix 300, 302 or 304 corresponding with the particular type of box sending the message. The matrixes control the display lights of groups 20, 22 and 24, respectively. Consequently, a COMPARE signal energizes one of the matrixes 300–304. All of these matrixes receive input logic in parallel from lines 310, 312 which logic is controlled by transferring data to the output side of unit 320. This data appears on input lines 322, 324 connected to register 70 at BCD digits 7 and 6, respectively. A data transfer signal line 326 is caused by a COMPARE signal. This transfers data indicative to the function of the message as read by lines shown as lines 322, 324. The function logic is then used by matrix input lines 310, 312 connected to all matrixes 300–304. Of course, more than one line is used to read the binary coded decimal information in positions 7 and 6 of shift register 70. This information is transferred to the input side of matrixes 300, 302, which could involve more than the two lines 310, 312 as shown in FIG. 5.

In operation, a tone message through channel D is indexed into shift register 70 in accordance with standard practice. As soon as the register is full of BCD information of a given message, a signal in line 72 starts counter 100. Counter 100 is incremented until comparison circuit 102 indicates a correspondence between the address portion of the message stored in register 70 (T1–T5) and the incremented position of counter 100. This comparison causes a COMPARE signal to stop the counter and to transfer box select data through data transfer unit 220 to the decoder 230. Also, data from digits 7 and 6 is transferred by unit 320 to the input side of output matrixes 300–304. These matrixes are energized by the logic in selector lines 232–236 so that only one of the output matrixes is energized for a given message. Two digits of register 70 are used to indicate a particular function of one of three different types of call boxes 10–16. In this manner, there is an expansion of the capacity of station A. It is possible to employ even further output matrixes since the logic on lines 202, 204 could be decoded as four different selector signals. By providing three bits of data from an indexable memory, eight separate output matrixes could be controlled for use with function data or information contained on one or two tone digits of the incoming message. The output matrix select feature using data stored in an indexable memory indexed by a counter or other indexing system increases the output capabilities of base station A.

Figure 4A:
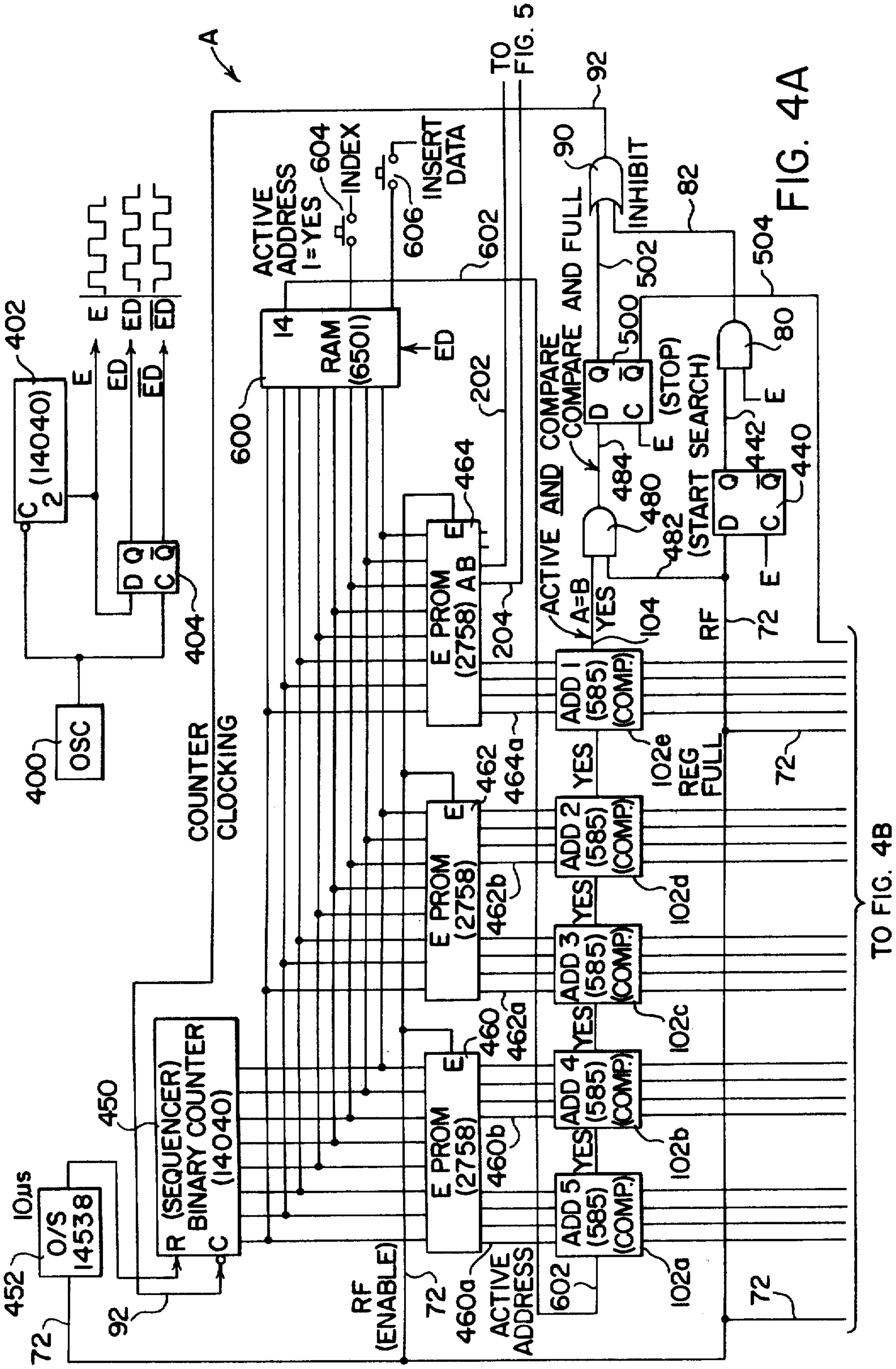
FIGS. 4A and 4B are wiring diagrams of the preferred embodiment of the present invention which is to be taken together with the wiring diagram of FIG. 5; and, FIG. 6 is a schematic wiring diagram showing the internal system test feature of the preferred embodiment of the present invention as illustrated in FIGS. 4 and 5.
Figure 4B:
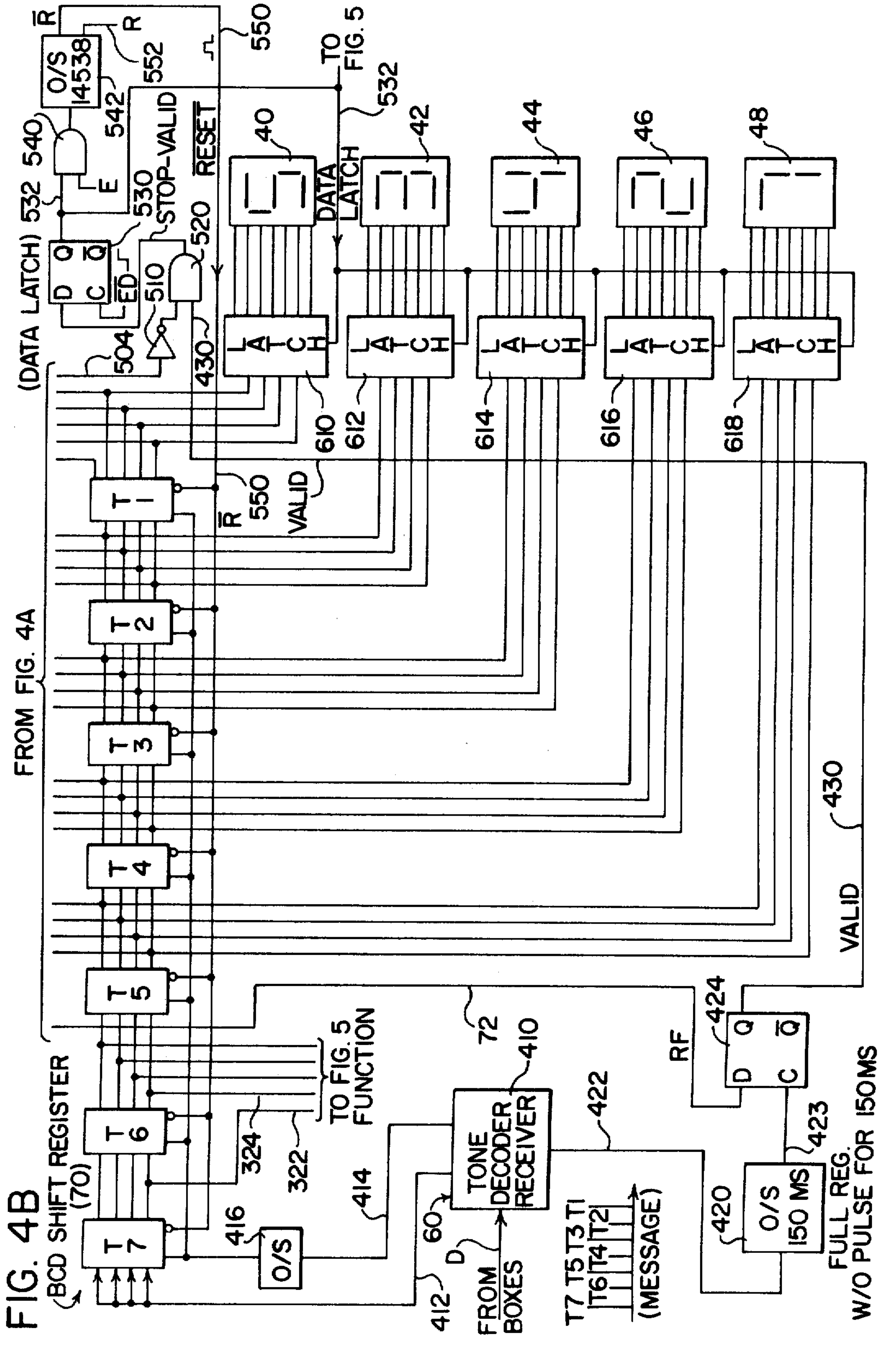
Figure 5:
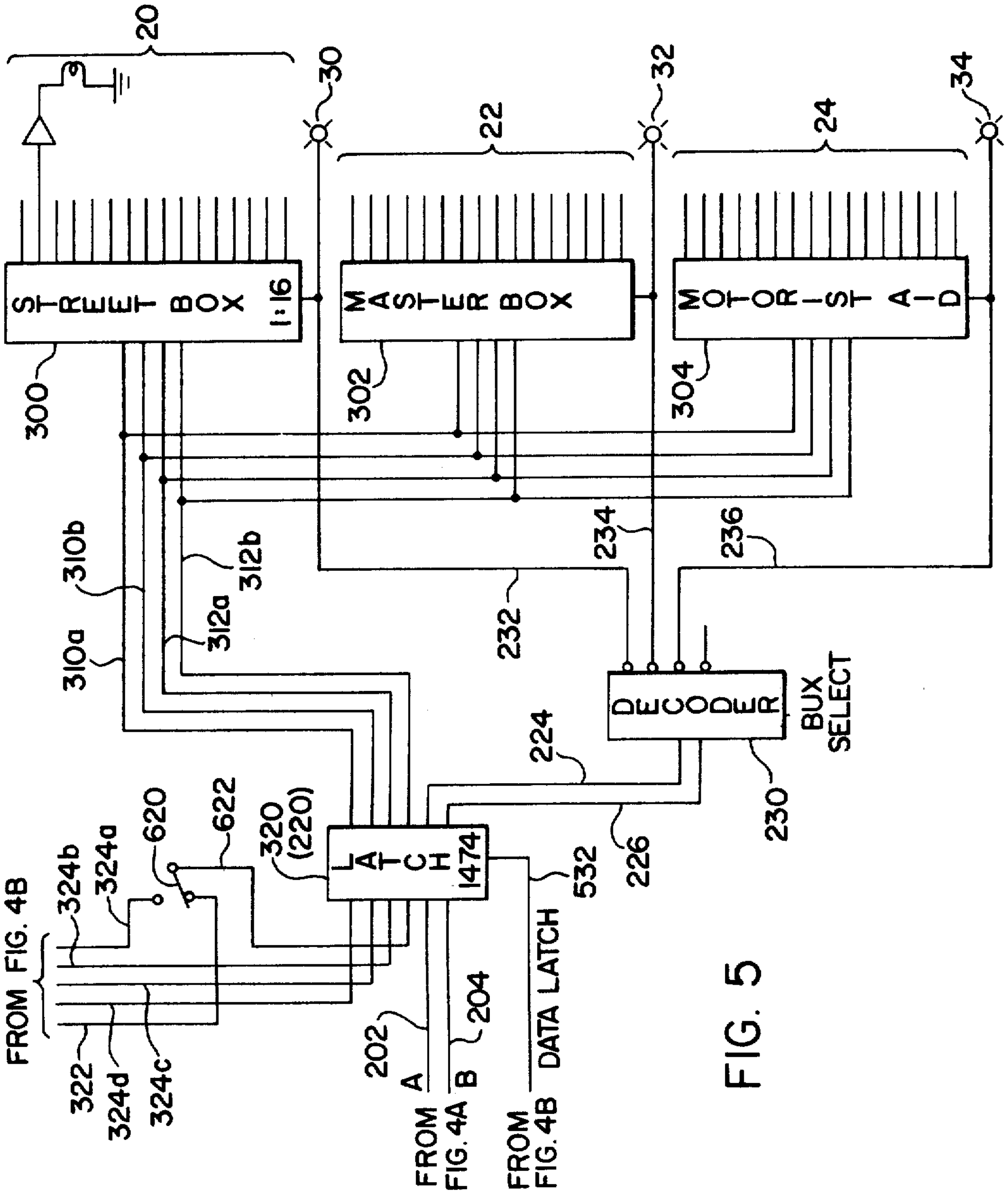

Referring now to FIGS. 4 and 5, a more detailed description of the preferred embodiment of the invention is illustrated. The features of FIG. 3 are employed; however, a slightly different arrangement is used for comparing the register address with increments of a counter. In FIG. 4, the indexable memory device (EPROMs) output digit data to make the comparison. In practice, the concept of FIG. 4 is used. FIGS. 4 and 5 are to be taken together and like numbers from FIG. 3 are used for the same general structure in the illustrated base station circuit. Tone processor 60 shown in FIG. 4 is a standard unit for receiving several tone messages from the communication channel D and decoding the incoming tones of the message to produce four bits of parallel binary data indicative of the digit of each successive tone. This data is directed by four lines 412 to first stage (T7) of a standard BCD shift register 70. The four bits of parallel data progress from stage T7 toward stage T1 by a shift signal in accordance with known practice and illustrated as a change in logic in line 414. This change of logic indicates the receipt of a tone. The signal in line 414 actuates one shot device 416 to shift data through stages of shift register 70. This procedure is all in accordance with standard practice. A base station, such as station A has circuitry to process the stored binary representation of the tones of a tone message. In accordance with the invention storage of the BCD digits in register 70 precludes the use of the invention and can be done in any manner.

A single pulse of logic is created in line 414 after each incoming tone of a message. In a like manner a pulse is created in line 422. The logic in line 422 resets one shot device 420 so that the output of the one shot device does not toggle until there is a delay of 150 ms, without the receipt of a tone to reset device 420. When the 150 ms lapses without a tone, output 423 is toggled to clock flip-flop 424 having a data terminal D connected to the shift register full line 72, also designated line RF. If the register is full and there has been a delay of 150 ms from the last tone, flip-flop 424 is toggled by one shot device 420. This produces a VALID signal in line 430 which means that there is a full compliment of BCD data at the various stages of register 70. When RF line 72 shifts to a logic 1 by filling of register 70, which is created at stage T1, D logic on the start search flip-flop 440 shifts to a logic 1. Upon the receipt of the next internal clock E, this logic 1 is shifted to output 442 which is the input of AND gate 80.

To create these various clocks, any arrangement could be provided. In practice, an oscillator 400, as shown in the upper portion of FIG. 4 increments a binary counter 402. This produces E clock at the divide by two output. To create a delayed clock ED and a delay inverted clock $\overline{ED}$, flip-flop 440 is employed. This delays the Q output slightly since it is clocked on a different edge of the output pulses of oscillator 400. Thus, the ED clock is offset from clock E by ½ the period of oscillator 400. The general relationship of the various clocks is shown in the pulse diagram adjacent the upper portion of FIG. 4. These clocks are employed in FIGS. 4 and 5. Of course, other arrangements could be provided for producing the various clocks to be used in the base station circuit constructed in accordance with the present invention.

When the logic in lines 442 shifts to a logic 1, gate 80 is enabled. Thus, clocking pulses E appear in line 82 which is directed to the OR gate 90. This starts clocking pulses in line 92, since the other input of OR gate 90 is at a logic 0, as will be apparent from the description of this illustrated embodiment. Clocking pulses in line 92 increment binary counter 450 so that the output of the counter is counted, in binary fashion, upon receipt of clocking pulses. Counter 450 is reset when a register full (RF) condition exist as indicated by the logic of line 72. This logic shifts to a logic 1 and causes a reset pulse at the reset terminal of counter 450 through one shot device 452 having a time of 10 $\mu$s. This one shot device causes a short pulse when line 72 shifts to a logic 1. The output lines of counter 450 are connected in parallel to EPROMs 460, 462, and 464. These PROMs are programmed at the factory to index from location to location upon receipt of increasing binary numbers indicated by the change of logic of the output lines from counter 450. Since the EPROMs index together upon output changes from counter 450, these read only memory devices shift from location to location in unison. Each of these indexed locations includes five binary numbers indicated by output lines groups 460*a*, 460*b* (EPROM 460) 462*a*, 462*b* (EPROM 462), and 464*a* (EPROM 464). Thus, as binary counter 460 indexes the programmed read only memories 460-464, in unison, a series of binary numbers appear at lines groups 460*a*, 460*b*, 462*a*, 462*b*, and 464*a*. These BCD digits are known numbers. The various remote boxes are added to correspond to the BCD digits at one indexed memory location so that each box will have five address digits corresponding to a single indexed location in the five output stages of EPROMs 460, 462 and 464. The EPROMs are enabled when register 70 is filled to produce a logic 1 in RF line 72. Within a very short time determined by one shot device 452, counter 450 starts counting when start flip-flop 440 is toggled by a pulse in the clock E. Thereafter, the five address stages of the EPROMs shift in unison from location to location in the EPROMs. At the same time, the second BCD digit of EPROM 464 includes four output lines only two of which are used. These lines are labeled A, B and are connected to box selector lines 204, 202, respectively. The purpose of these lines is to determine the type of box sending the toned message so that the function tones can be properly decoded. Thus, as the EPROMs are indexed, in unison, six BCD digits are created in parallel. These BCD digits are known according to the indexed position or location of the EPROMs. The first five digits, in practice, are used as addresses for specific remote boxes 10-16. For that reason, the BCD logic in register 70 will correspond, digit-for-digit, with the BCD logic outputted from the EPROMs as the EPROMs are being indexed from location-to-location by counter 450. To make this digit-by-digit comparison, there are provided five address comparison modules (14585 type sold by Motorola). Each of these modules or units compares the BCD data from one stage of an EPROM with the BCD in a stage of register 70. A comparison signal is created if the digits are all equal. These separate comparison units or modules are indicated as 102*a-e*. If there is a comparison between the address in stages T1-T5 of register 70 with the data at an indexed location of the EPROMs 460-464, a COMPARE signal is created in line 104, as previously described with respect to FIG. 3. This indicates that the EPROMs have been indexed to the precise location corresponding to the address of the call box sending the message to be processed by base station A. As will be described later, the comparator circuits or units are activated in accordance with a programmable RAM so that the comparison can be made only if the indexed location of the EPROMs is an ACTIVE address, as programmed into the RAM. This is only a check on the existence of a box and is a feature which will be described later.

A logic 1 is produced in line 104 when an ACTIVE box is identified. This enables gate 480 having another input line 482 connected to register full (RF) line 72. Thus, if the register is full and there has been a comparison, a logic 1 appears in output line 484 of gate 480. This procedures a logic 1 at flip-flop 500 which is used to stop the counting by inhibiting logic flow through gate 90. Upon the next E clock pulse, flip-flop 500 produces a logic 1 in line 502 which inhibits gate 90 and stops counting pulses from flowing into counting line 92. Thus, flip-flop 440 starts the search for a match between the address in register 70 and a particular indexed location of the EPROMs 460-464. When there has been a match, flip-flop 500 stops the counting process. When this happens, $\overline{Q}$ line 504 shifts to a logic 0. This is inverted by inverter 510 to combine with the logic on VALID line 430 to activate gate 520. This produces a logic 1 at the data terminal D of data latch 530. Upon the next $\overline{ED}$ clock, a logic 1 is placed on the data latch line 532. This logic latches data into the various output positions of the base station by transferring data into latches. This is generally the end of the message recognition function. The appropriate lights on console face B are actuated. If wanted, a hard copy can be made by printing the data gathered and set into the output positions of base station A. This can be done by a parallel printing device not forming a part of the present invention which is directed to processing of the message and selecting specified functions in a novel manner. To reset the system, gate 540 is activated by the data latch line 532 and operates one shot device 542 to create a reset pulse $\overline{R}$ in reset line 550. This pulse controls the resetting of register 70. A positive reset pulse appears in line 552 to reset any component in the circuit requiring resetting by a positive pulse.

Referring now to RAM 600, as previously mentioned, this RAM is programmed to indicate which addresses in EPROMs 460-464 are active. RAM 600 can be of the type manufactured by Harris as number 6501. When the EPROMs have been indexed, the input terminals to RAM 600 are changed in the same manner. Then a delayed clock ED indexes the RAM to place a single bit of logic on output line 602. This logic, a 0 or a 1, is programmed for separate and distinct locations in RAM 600. If the logic at an indexed location for RAM 600 is a logic 1, a logic 1 is applied by line 602 to the input side of comparator circuit or unit 102*a*. This activates circuit or unit 102*a* so that a digit comparison produces a YES signal to the input side of comparator unit 102*b*. This YES signal ripples through the various comparator circuits or units 102*a-e* to create the logic 1 COMPARE signal in line 104 as long as there is a comparison of all digits and a logic 1 in line 602. By programming a logic 1 at specific indexed locations in RAM 600, particular addresses in PROMs 460–464 can be activated. This can be done at the base station by indexing RAM 600 manually with a pushbutton 604. After a specific indexed location is reached, pushbutton 606 is energized to place a logic 1 into that RAM location to indicate an active box address. Other arrangements could be used for reading the address of the various RAM locations into which a logic 1 is to be inserted for designating an active box address. In practice, the RAM locations in BCD form are multiplexed through latches 610–616 and are displayed in 7-Bar units 40–48.

After the message has been identified, the BCD data from stages T1–T5 of register 70 is directed to the input of data latches and decoders 610–618. When there is a data latch signal in line 532, this data is latched into decoders 610–618 and into 7-Bar information. This information controls display digits in units 40–48. To display the desired function, it is necessary to process the data at stages T6 and T7 in register 70. This is best seen in FIG. 5 wherein lines 324a–324d and 322 are directed to a data latch corresponding to latch 320 in FIG. 3. A data latch signal in line 532 causes binary logic from one side of latch 320 to output lines 310a, 310b, 312a, 312b. These lines are decoded by one of matrixes 300–304 to control specific output inidica of the selected output matrixes 300–304. Matrixes 300–304 decode four bit into sixteen specific one bit function displays. The logic on lines 310a, 310b, 312a and 312b is directed to all three of the output matrixes as is shown in FIG. 5. As illustrated in FIG. 2, tones T6 and T7, as stored in stage T6, T7 of register 70, are used to control the function to be indicated by one of the output matrixes. Since tone T7, in the preferred embodiment, can be either BCD 8 or BCD 9, only one bit of the four bits in stage T7 need to be monitored. This bit is connected to line 322 and is logic 0 when tone T7 is digit 8 and logic 1 when tone T7 is digit 9. By shifting switch 620 into the position shown in FIG. 5, this one bit of information can be read and used as input to the matrixes 300–304 for recognizing the particular function activated at the call box. In some instances, only a single tone such as T6 may be used in a message. In that situation, switch 620 will be shifted to engage line 324a to provide four bits of binary logic from a single tone T6. This precludes data from tone T7. Either one of these type of function connections can be employed in the preferred embodiment of the invention.

Data latch 320 also includes a section corresponding to latch or transfer device 220 of FIG. 3. In this manner, the binary data on lines 202, 204 is shifted to lines 224, 226 when there is a data latch signal in line 532. A standard 1 of 4 decoder 230 produces a logic 1 in one of the output matrixes select lines 232–236, as previously described. These lines activate one of matrixes 300–304 to energize particular lights or other indicia on console face B of base station A, as shown in FIG. 1. One of these lights is schematically illustrated as the second terminal of output matrixes 30 in FIG. 5.

As so far described, the general operation of the detail circuit shown in FIGS. 4 and 5 corresponds with the general arrangement of the block diagram of FIG. 3, except for certain peripheral equipment, such as RAM 600. In addition, the indexable memory of FIG. 3 is a series of EPROMs connected directly to the comparator instead of being an indexable memory 200 controlled in unison with counter 100. The operations of these types of memory indexing concepts are essentially the same with respect to advancing the indexable memory to locations determined by the identification code of a message being received and processed by the base station.

Figure 6:
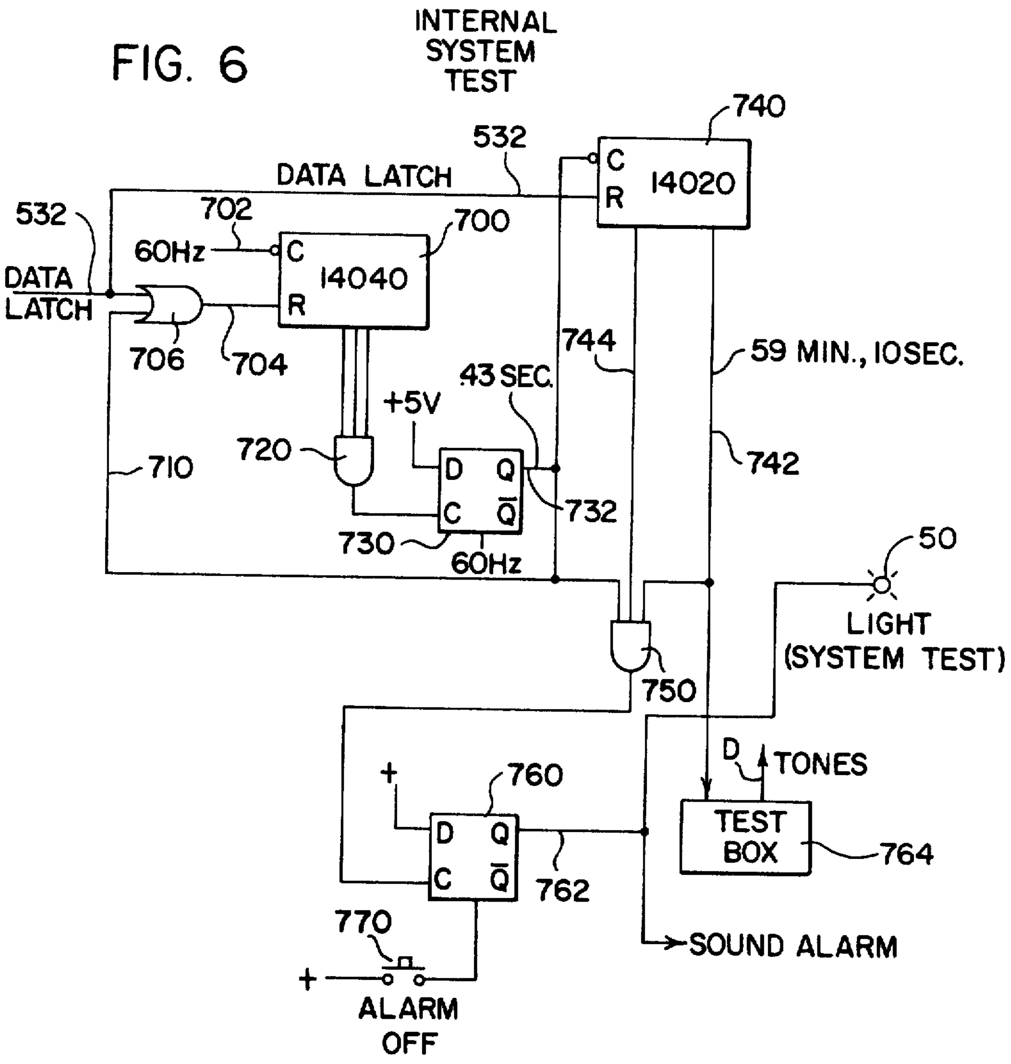

In accordance with another aspect of the present invention, base station A is provided with an internal system test feature. An alarm is energized if there is no recognized message for a prolonged period of time which, in the illustrated embodiment, is fifty nine minutes and ten seconds. This internal system test is controlled by logic 1 in data latch line 532, which occurs whenever a message has been processed. As shown in FIG. 6, counter 700 is counted by a sixty hertz pulse train created in line 702. This counter is reset by a logic 1 in line 704 from gate 706 controlled by either a data latch signal or by a signal in line 710. Consequently, whenever there is a data latch signal counter 700 is reset. Gate 720 reads certain stages of counter 700 and produces a logic 1 at a clocking terminal for flip-flop 730 to clock a logic 1 into line 732 each 0.43 sec. A logic 1 in line 732 clocks counter 740, having outputs 742, 744 which shift to a logic 1 at fifty nine minutes and ten seconds. After each 0.43 sec. interval a logic 1 in line 732 causes a logic 1 to appear in line 710 to reset counter 700. This again counts until 0.43 sec. has expired and a logic 1 appears in line 732. If there has been no pulse in line 532 to reset counter 740 for the time indicated by line 742, test call box 764 is activated to create a fictitious tone message in channel D to activate base station A. If there has been no pulse on line 532 to reset counter 740 for the time indicated by lines 742, 744, gate 750 is activaed at the next signal in line 732. This clocks a logic 1 through flip-flop 760 to produce a logic 1 in output line 762. This activates light 50 and a sound alarm to alert the operator that the base station requires testing and possible repair. To clear this sound alarm a pushbutton 770 is manually actuated. This clears flip-flop 760.

Having thus described the invention, it is claimed:

1. In a base station for monitoring the status of several function conditions at remote call boxes, each of which is assigned a distinctive identification code and is capable of selectively transmitting a message in the form of a plurality of successive signals upon a change in a function condition, several of said signals being representative of a box identification code and at least one of said signals being a code representative of the changed function condition, said base station having means for decoding said message, the improvement comprising: said decoding means including means for creating a particular one of a plurality of output selector signals upon decoding of a given box idenfication code in a message being processed; means for creating a particular output function signal in response to said coded representation of said message being processed; means for directing said output function signal in parallel to a plurality of output matrixes each of which has a particular exhibited function indicia controlled by said output function signal when said matrix is energized and means for energizing a selected one of said matrixes by the created output selector signal.

2. The improvement as defined in claim 1 wherein said signal creating means includes an indexable memory device for storing particular output selector data at selected indexed memory locations corresponding to box identification codes, means for indexing said memory device until the particular location at the box identification code of a message being processed is reached and means for creating a particular output selector signal by said output selector data at said particular memory location.

3. The improvement as defined in claim 2 wherein said memory indexing means includes a binary counter.

4. The improvement as defined in claim 3 wherein said indexing means includes a comparator circuit connected to said memory device for reading the address of said indexed location; register means for storing said identification code of said message being processed in address form; means for directing said identification code address to said comparator circuit; said comparator circuit including means for creating a compare output when said identification code matches said indexed location address; and means for stopping said memory indexing means by said compare output and with said memory device at a location determined by said compare output.

5. The improvement as defined in claim 4 including means for creating a control signal when a message has been received by said base station and said stopping means including means for preventing stopping of said memory indexing means until said control signal has been created.

6. The improvement as defined in claim 2 wherein said indexing means includes a comparator circuit connected to said memory device for reading the address of said indexed location; register means for storing said identification code of said message being processed in address form; means for directing said identification code address to said comparator circuit; said comparator circuit including means for creating a compare output when said identification code matches said indexed location address; and means for stopping said memory indexing means by said compare output and with said memory device at a location determined by said compare output.

7. The improvement as defined in claim 6 including means for creating a control signal when a message has been received by said base station and said stopping means including means for preventing stopping of said memory indexing means until said control signal has been created.

8. The improvement as defined in claim 2 including means for creating a control signal when a message has been received by said base station and means for stopping said memory indexing means only after said control signal has been created.

9. The improvement as defined in claim 4 including means for creating a control signal when a message has been received by said base station and means for stopping said memory indexing means only after said control signal has been created.

10. The improvement as defined in claim 9 including a second memory device having binary data stored at locations corresponding to locations in said first mentioned memory device; means for indexing said second memory device with said first memory device and means for stopping said indexing means only at a location in said first memory device which corresponds to a location in the second memory device where specific binary data is stored.

11. The improvement as defined in claim 10 wherein said binary data is either a logic 1 or a logic 0.

12. The improvement as defined in claim 4 including a second memory device having binary data stored at locations corresponding to locations in said first mentioned memory device; means for indexing said second memory device with said first memory device and means for stopping said indexing means only at a location in said first memory device which corresponds to a location in the second memory device where specific binary data is stored.

13. The improvement as defined in claim 12 wherein said binary data is either a logic 1 or a logic 0.

14. In a base station for monitoring the status of several function conditions at remote call boxes, each of which is assigned a distinctive identification code and is capable of selectively transmitting a message in the form of a plurality of successive signals upon a change in a function condition, several of said signals being representative of a box identification and at least one of said signals being representative of the changed function condition, said base station having means for decoding said message, the improvement comprising: means for storing said signals of a message in binary coded decimal data format in digital stages of a binary coded decimal register; a read only memory device having indexable locations with binary coded decimal data corresponding to said register stages; means for comparing binary coded decimal data for said indexable locations with said stored binary coded decimal data; means for indexing said read only memory until a comparison of said stored data to said memory data; means for stopping said indexing means upon said comparison; means for creating a particular selector signal by decoding data at said indexed memry location when said indexing means is stopped; and means for energizing one of a plurality of output matrixes by said selector signal.

15. In a base station for monitoring the status of several function conditions at remote call boxes, each of which is assigned a distinctive identification code and is capable of selectively transmitting a message in the form of a plurality of successive signals upon a change in a function condition, several of said signals being representative of a box identification and at least one of said signals being representative of the changed function condition, said base station having means for decoding said message, the improvement comprising: a test call box at said base station and means for creating a message when said test call box is energized; timer means for creating a signal to energize said test call box when said timer means times out after a selected time without a reset; and means for resetting said timer upon receipt of a message from a remote call box.

16. In a base station for monitoring the status of several function conditions at remote call boxes, each of which is assigned a distinctive identification code and is capable of selectively transmitting a message in the form of a plurality of successive signals upon a change in a function condition, several of said signals being representative of a box identification and at least one of said signals being representative of the changed function condition, said base station having means for decoding said message, the improvement comprising: an indexable memory device having locations with addresses corresponding to said identification codes of said boxes; means for storing a current message; means for indexing said memory through said location; means for stopping said indexing means in accordance with said stored message; means for outputting binary data from said indexed memory location after said indexing means has been stopped; means for creating a particular selector signal by said binary data; and means responsive to said selector signal for energizing one of a plurality of output matrixes.

17. The improvement as defined in claim 16 including means for creating an output signal in accordance with said at least one signal and means for actuating a portion of said energized matrix by said output signal.

18. In a base station for monitoring the status of several function conditions at remote call boxes, each of which is assigned a distinctive identification code and is capable of selectively transmitting a message in the form of a plurality of successive signals upon a change in a function condition, several of said signals being representative of a box identification and at least one of said signals being representative of the changed function condition, said base station having means for decoding said message, and means for indicating information regarding said message, the improvement comprising: a read only memory having locations identified by numbers; means for indexing said memory through said locations until said memory location numbers correspond with said box identification code; means for reading data from said read only memory at said stopped location; and means for using said data with said message to activate said information indicating means.

19. The improvement as defined in claim 18 including means for creating a message received signal when a message is received; means for stopping said memory indexing means; and means for activating said stopping means only after creating said message received signal.

20. The improvement as defined in claim 19 including a second memory device and means for indexing said second memory device with said first mentioned memory device through locations corresponding to memory locations of said first mentioned memory device and means for allowing operation of said stopping means if particular data is stored at a location in said second memory device when said stopping means attempts to stop said first mentioned memory device.

* * * * *